(12) United States Patent
Van Heeringen et al.

(10) Patent No.: US 8,680,186 B2
(45) Date of Patent: Mar. 25, 2014

(54) SEMI-CRYSTALLINE POLYOLEFIN COMPOSITION, METHOD OF PRODUCING THE SAME, AND ARTICLES MADE THEREFROM

(75) Inventors: Mark J. M. Van Heeringen, Bergen Op Zoom (NL); Marlies C. Totte van't Westeinde, Oostburg (NL); Dorothy Klasen, Sas Van Gent (NL); Jian-Yang Cho, Ambler, PA (US); Yannick Saint-Gerard, Roquefort-les-Pins (FR)

(73) Assignees: Rohm and Haas Company, Philadelphia, PA (US); Dow Global Technologies LLC, Midland, MI (US)

( * ) Notice: Subject to any disclaimer, the term of this patent is extended or adjusted under 35 U.S.C. 154(b) by 0 days.

(21) Appl. No.: 13/539,316

(22) Filed: Jun. 30, 2012

(65) Prior Publication Data

US 2013/0030100 A1 Jan. 31, 2013

Related U.S. Application Data

(60) Provisional application No. 61/513,402, filed on Jul. 29, 2011, provisional application No. 61/515,648, filed on Aug. 5, 2011.

(51) Int. Cl.
| | |
|---|---|
| *C08G 12/12* | (2006.01) |
| *C08K 5/20* | (2006.01) |
| *B29C 33/60* | (2006.01) |
| *C08L 23/00* | (2006.01) |

(52) U.S. Cl.
USPC .................... 524/226; 524/227; 524/229

(58) Field of Classification Search
USPC .......................... 524/226, 227, 229
See application file for complete search history.

(56) References Cited

U.S. PATENT DOCUMENTS

| 3,683,020 A * | 8/1972 | Luethi et al. ............. 564/153 |
| 7,585,909 B2 * | 9/2009 | Ma et al. .................. 524/212 |
| 2005/0203226 A1 | 9/2005 | Mader et al. |
| 2007/0117890 A1 | 5/2007 | Ma et al. |
| 2007/0117891 A1 | 5/2007 | Ma et al. |

FOREIGN PATENT DOCUMENTS

| DE | 1768110 | 6/1971 |
| DE | 2120954 | 11/1971 |
| EP | 1365741 | 3/2003 |

OTHER PUBLICATIONS

S. Moritomi, T. Watanabe, and S. Kanzaki, Polypropylene compounds for Automotive Applications, R&D Report, Sumitomo Kagaku Jan. 2010, p. 2-3.*
WO Written Opinion and Search Reported dated Nov. 7, 2012; from counterpart PCT Application No. PCT/US2012/045147.
Xuzhong Luo; "Sel-assembled Organogels formed by Monoalkyl Derivatives of Oxamide," Chem. Comm. 2000, pp. 2091-2092.
J. Makarevic et al.; Chiral Bis (amino alohol) oxalamide Gelators—Gelation Properties and Supramolecular Organ.: Racemate v. Pure Enantiomer Gelation; Chem. Eur. J. 2003, 9, pp. 5567-5580.
Moritomi et al.; "Beta Nucleating Masterbatch Offers Enhanced Properties in Polypropylene Products," Plastics Additives & Compounding May/Jun. 2007 pp. 28-31.

* cited by examiner

*Primary Examiner* — Ling Choi
*Assistant Examiner* — Ronald Grinsted

(57) ABSTRACT

A semi-crystalline polyolefin composition comprising: a thermoplastic crystallizable polyolefin; and one or more dialkyl bis-oxalamide compounds having the formula:

$$R_2^a{-}NH{-}C(O){-}C(O){-}NH{-}R_1{-}NH{-}C(O){-}C(O){-}NH{-}R_2^b$$

wherein $R_1$ is a spacer group and each $R_2$ is a peripheral group and wherein each of $R_1$ and $R_2^a$ and $R_2^b$ is an independently selected hydrocarbyl group is provided. Also provided are a method for producing the semi-crystalline polyolefin composition and articles made therefrom.

10 Claims, No Drawings

SEMI-CRYSTALLINE POLYOLEFIN COMPOSITION, METHOD OF PRODUCING THE SAME, AND ARTICLES MADE THEREFROM

FIELD OF INVENTION

The instant invention relates to a semi-crystalline polyolefin composition, method of producing the same, articles made therefrom, and methods for making such articles.

BACKGROUND OF THE INVENTION

In polypropylene and some other semi-crystalline polymers, the use of nucleators that enhance the crystallization process is well established. Several types of commercially available nucleators exist such as sodium benzoate, talc, sodium phospate salt (e.g., Na-11, Na-21), N,N-dicyclohexyl-2,6-naphthalenedicarbbis-oxalamide, and bicyclic [2,2,1]heptane di-carboxylate (HPN-68). These typical inorganic and organic salt nucleator additives have high melting points and do not melt or dissolve in polypropylene at typical processing temperatures and as such serve as external nuclei for crystallization.

Also used are "melt sensitive" nucleators (based on modified sorbitols) which not only enhance crystallization but also influence the crystallite sizes. These organic compounds typically have high melting points, are soluble in a polypropylene melt, yet form fibrilar networks during cooling and as such account for more homogeneous nucleation. Because such "melt sensitive" nucleators decrease the crystallite sizes, a substantially reduced haze is the result, thereby extending the application space for semi-crystalline polypropylene (e.g., beverage bottles, food containers, CD cases and other clear packaging).

Because these additives also change the optical properties of the polymer, they may be referred to as clarifiers. Typically, clarifiers are always nucleators but nucleators are not necessarily clarifiers. Currently, prices for a clarifier additive are high and lacking competition, which puts clarified polypropylene (cPP) margins under pressure. Clearly, there is a need for new generations of clarifiers that set new benchmarks for cost and performance.

SUMMARY OF THE INVENTION

The instant invention is a semi-crystalline polyolefin composition, method of producing the same, and articles made therefrom.

In one embodiment, the instant invention provides a semi-crystalline polyolefin composition comprising: a thermoplastic crystallizable polyolefin; and one or more di-alkyl bis-oxalamide compounds having the formula:

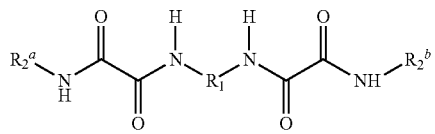

wherein $R_1$ is a spacer group and each $R_2$ is a peripheral group and wherein each of $R_1$ and $R_2^a$ and $R_2^b$ is an independently selected hydrocarbyl group.

In an alternative embodiment, the instant invention further provides a method of making a semi-crystalline polyolefin composition comprising: providing a polyolefin matrix; adding to the polyolefin matrix one or more di-alkyl bis-oxalamide compounds having the formula:

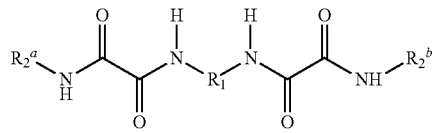

wherein $R_1$ is a spacer group and each $R_2$ is a peripheral group and wherein each of $R_1$ and $R_2^a$ and $R_2^b$ is an independently selected hydrocarbyl group.

In another alternative embodiment, the instant invention further provides a method of making a semi-crystalline polyolefin composition comprising: providing a polyolefin;
adding to the polyolefin one or more di-alkyl bis-oxalamide compounds having the formula:

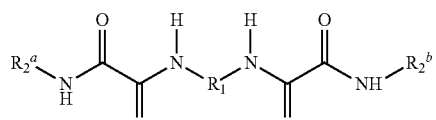

wherein $R_1$ is a spacer group and each $R_2$ is a peripheral group and wherein each of $R_1$ and $R_2^a$ and $R_2^b$ is an independently selected hydrocarbyl group; and compounding the polyolefin with the one or more di-alkyl bis-oxalamide compounds using one or more processes selected from the group consisting of injection molding, blow molding, compression molding, roto-molding, slush molding and extrusion.

In another alternative embodiment, the instant invention further provides a shaped article comprising the semi-crystalline polyolefin composition according to any one of the embodiments disclosed herein or produced by the methods disclosed herein.

In an alternative embodiment, the instant invention provides a semi-crystalline polyolefin composition, method of producing the same, and shaped articles made therefrom, in accordance with any of the preceding embodiments, except that each of $R_1$ and $R_2$ is selected from the group consisting of: $C_1$-$C_{20}$ alkyl; $C_1$-$C_{20}$ alkyl substituted by $C_1$-$C_{20}$ alkylamino, di($C_1$-$C_{20}$ alkyl)amino, $C_1$-$C_{20}$ alkyloxy or hydroxy; (poly($C_2$-$C_4$ alkoxy))-($C_2$-$C_4$ alkyl); $C_2$-$C_{20}$ alkenyl; $C_3$-$C_{12}$ cycloalkyl; $C_3$-$C_{12}$ cycloalkyl substituted by 1, 2 or 3 $C_1$-$C_{20}$ alkyl; cyclohexylmethyl; cyclohexylmethyl substituted by 1, 2 or 3 $C_1$-$C_{20}$ alkyl; $C_3$-$C_{20}$ cycloalkenyl; $C_3$-$C_{12}$ cycloalkenyl substituted by 1, 2 or 3 $C_1$-$C_{20}$ alkyl; phenyl; phenyl substituted by 1, 2 or 3 radicals selected from the group consisting of $C_1$-$C_{20}$ alkyl, $C_1$-$C_{20}$ alkyloxy, hydroxy, phenylamino, acylamino, phenylazo; phenyl substituted by halogens; $C_7$-$C_9$ phenylalkyl; $C_7$-$C_9$ phenylalkyl which is substituted on the phenyl by 1, 2 or 3 radicals selected from the group consisting of $C_1$-$C_{20}$ alkyl, $C_1$-$C_{20}$ alkoxy, and hydroxy; naphthyl; naphthyl substituted by $C_1$-$C_{20}$ alkyl; adamantyl; adamantyl substituted by $C_1$-$C_{20}$ alkyl; and a 5- or 6-membered heterocyclic group.

In an alternative embodiment, the instant invention provides a semi-crystalline polyolefin composition, method of producing the same, and shaped articles made therefrom, in accordance with any of the preceding embodiments, except that $R_1$ is selected from the group consisting of alkyls having from 6 to 12 carbon atoms, cycloalkyls having from 3 to 20 carbon atoms and aryls, and each $R_2$ is selected from the group consisting of alkyls having from 2 to 18 carbon atoms, cycloalkyls, and aryls, and wherein the $R_2^a$ and $R_2^b$ may be the same or different alkyls.

In an alternative embodiment, the instant invention provides a semi-crystalline polyolefin composition, method of producing the same, and shaped articles made therefrom, in accordance with any of the preceding embodiments, except that the one or more bis-oxalamide compounds are present in a total amount from 0.001 to 5 percent by weight.

In an alternative embodiment, the instant invention provides a semi-crystalline polyolefin composition, method of producing the same, and shaped articles made therefrom, in accordance with any of the preceding embodiments, except that $R_1$ is selected from the group consisting of hexyl, cyclohexyl and phenyl.

In an alternative embodiment, the instant invention provides a semi-crystalline polyolefin composition, method of producing the same, and shaped articles made therefrom, in accordance with any of the preceding embodiments, except that each $R_2$ is selected from the group consisting of 1-dodecyl, 2-ethylhexyl, cyclohexyl, 4-methylphenyl, sec-butyl, and tert-butyl.

In an alternative embodiment, the instant invention provides a semi-crystalline polyolefin composition, method of producing the same, and shaped articles made therefrom, in accordance with any of the preceding embodiments, except that the semi-crystalline polyolefin composition exhibits a reduction in haze of at least 15% in comparison to that of the semi-crystalline polyolefin in the absence of a clarifier.

In an alternative embodiment, the instant invention provides a semi-crystalline polyolefin composition, method of producing the same, and shaped articles made therefrom, in accordance with any of the preceding embodiments, except that the semi-crystalline polyolefin composition exhibits an increase of the crystallization temperature of at least 4° C. in comparison to that of the polyolefin matrix.

In an alternative embodiment, the instant invention provides a semi-crystalline polyolefin composition, method of producing the same, and shaped articles made therefrom, in accordance with any of the preceding embodiments, except that the thermoplastic crystallizable polyolefin is a crystallizable polypropylene.

In an alternative embodiment, the instant invention provides a semi-crystalline polyolefin composition, method of producing the same, and shaped articles made therefrom, in accordance with any of the preceding embodiments, except that the thermoplastic polyolefin is selected from the group consisting of propylene/α-olefin random copolymer, propylene/α-olefin segmented copolymer, and propylene/α-olefin block copolymer.

In an alternative embodiment, the instant invention provides a semi-crystalline polyolefin composition, method of producing the same, and shaped articles made therefrom, in accordance with any of the preceding embodiments, except that the method further comprises recovering the semi-crystalline polyolefin composition.

In an alternative embodiment, the instant invention provides a semi-crystalline polyolefin composition, method of producing the same, and shaped articles made therefrom, in accordance with any of the preceding embodiments, except that the step of adding one or more di-alkyl-bis-oxalamide compounds to the polyolefin is effected by twin screw extrusion.

In an alternative embodiment, the instant invention provides a semi-crystalline polyolefin composition, method of producing the same, and shaped articles made therefrom, in accordance with any of the preceding embodiments, except that the method further comprises processing the semi-crystalline polyolefin composition with one or more processes selected from the group consisting of injection molding, blow molding, compression molding, roto-molding, slush molding and extrusion.

In an alternative embodiment, the instant invention provides a semi-crystalline polyolefin composition, method of producing the same, and shaped articles made therefrom, in accordance with any of the preceding embodiments, except that wherein the α-olefin is ethylene or 1-butene.

In an alternative embodiment, the instant invention provides a semi-crystalline polyolefin composition, method of producing the same, and shaped articles made therefrom, in accordance with any of the preceding embodiments, except that the semi-crystalline polyolefin composition further comprises one or more β-nucleating agents selected from the group consisting of: (1) aromatic sorbitol acetals; (2) nucleating agents based upon salts of phosphoric acid; (3) nucleating agents based upon salts of carboxylic acids; (4) nucleating agents based upon carboxy aluminum-hydroxide; (5) nucleating agents based upon salts of rosin/adiabatic acid; (6) Zinc (II) monoglycerolate; (7) nucleating agents based upon diamide compounds; and (8) nucleating agents based upon trimesic acid derivatives.

In an alternative embodiment, the instant invention provides a semi-crystalline polyolefin composition, method of producing the same, and shaped articles made therefrom, in accordance with any of the preceding embodiments, except that the shaped article is a molded article.

In an alternative embodiment, the instant invention provides a semi-crystalline polyolefin composition, method of producing the same, and shaped articles made therefrom, in accordance with any of the preceding embodiments, except that the molding of the shaped article is effected by one or more processes selected from the group consisting of injection molding, blow molding, compression molding, roto-molding and slush-molding.

In an alternative embodiment, the instant invention provides a semi-crystalline polyolefin composition, method of producing the same, and shaped articles made therefrom, in accordance with any of the preceding embodiments, except that the shaped article is made by extrusion.

In an alternative embodiment, the instant invention provides a semi-crystalline polyolefin composition, method of producing the same, and shaped articles made therefrom, in accordance with any of the preceding embodiments, except that the shaped article is a film, fiber, profile, pipe, bottle, tank or container.

In another embodiment, the instant invention provides a semi-crystalline polyolefin composition consisting essentially of: a thermoplastic crystallizable polyolefin; and one or more di-alkyl bis-oxalamide compounds having the formula:

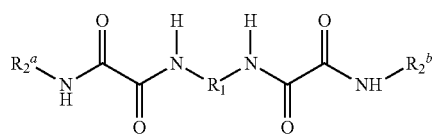

wherein $R_1$ is a spacer group and each $R_2$ is a peripheral group and wherein each of $R_1$ and $R_2^a$ and $R_2^b$ is an independently selected hydrocarbyl group.

In another alternative embodiment, the instant invention further provides a method of making a semi-crystalline polyolefin composition consisting essentially of: providing a polyolefin matrix; adding to the polyolefin matrix one or more di-alkyl bis-oxalamide compounds having the formula:

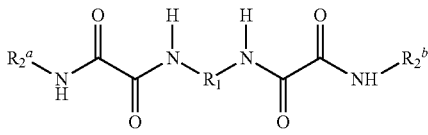

wherein $R_1$ is a spacer group and each $R_2$ is a peripheral group and wherein each of $R_1$ and $R_2{}^a$ and $R_2{}^b$ is an independently selected hydrocarbyl group.

DETAILED DESCRIPTION OF THE INVENTION

The instant invention is a semi-crystalline polyolefin composition, method of producing the same, articles made therefrom, and methods for making such articles.

The semi-crystalline polyolefin composition according to the present invention comprises: a thermoplastic crystallizable polyolefin; and one or more bis-oxalamide compounds having the formula:

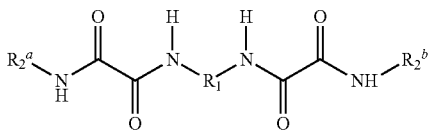

wherein $R_1$ is a spacer group and each $R_2$ is a peripheral group and wherein each of $R_1$ and $R_2{}^a$ and $R_2{}^b$ is an independently selected hydrocarbyl group.

In an alternative embodiment, the instant invention further provides a method of making a semi-crystalline polyolefin composition comprising: providing a polyolefin matrix; adding to the polyolefin matrix one or more bis-oxalamide compounds having the formula:

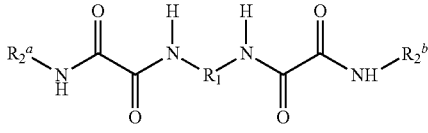

wherein $R_1$ is a spacer group and each $R_2$ is a peripheral group and wherein each of $R_1$ and $R_2{}^a$ and $R_2{}^b$ is an independently selected hydrocarbyl group.

In another alternative embodiment, the instant invention further provides a shaped article comprising the inventive semi-crystalline polyolefin composition.

Thermoplastic crystallizable polyolefins useful in the invention include linear polyethylene (PE), ethylene/α-olefin copolymers, ethylene/propylene/diene terpolymer (EPDM), polyethylene terephthalate (PET), polytetrafluoroethylene (PTFE), polypropylene (PP), polypropylene/α-olefin copolymers, and propylene/ethylene random copolymers.

Exemplary propylene/α-olefin random copolymers include those which are commercially available from The Dow Chemical Company, under the tradename VERSIFY™, or from ExxonMobil Chemical Company, under the tradename VISTAMAXX. Some non-limiting examples of EPDM interpolymers useful in the invention include NORDEL® IP 4770R, NORDEL® 3722 IP available from The Dow Chemical Company, Midland, Mich., and KELTAN® 5636A available from DSM Elastomers Americas, Addis, La.

Exemplary bis-oxalamide compounds useful in the invention include those having the

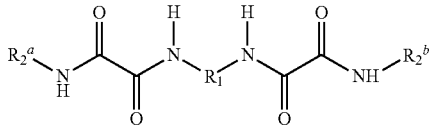

wherein $R_1$ is a spacer group and each $R_2$ is a peripheral group and wherein each of $R_1$ and $R_2{}^a$ and $R_2{}^b$ is independently selected from the group of hydrocarbyl and substituted hydrocarbyl groups.

In some embodiments of the invention, $R_2{}^a$ and $R_2{}^b$ are the same hydrocarbyl group. In some embodiments of the invention, $R_2{}^a$ and $R_2{}^b$ are different hydrocarbyl groups. In some embodiments of the invention, $R_1$, $R_2{}^a$ and $R_2{}^b$ are the same hydrocarbyl group. In some embodiments of the invention, $R_1$ and $R_2{}^b$ are the same hydrocarbyl group and $R_2{}^a$ is a different hydrocarbyl group. In some embodiments of the invention, $R_1$ and $R_2{}^a$ are the same hydrocarbyl group and $R_2{}^b$ is a different hydrocarbyl group.

"Hydrocarbyl" refers to univalent hydrocarbyl radicals containing 1 to about 30 carbon atoms, including branched or unbranched, saturated or unsaturated species, such as alkyl groups, alkenyl groups, and aryl groups. "Substituted hydrocarbyl" refers to hydrocarbyl substituted with one or more substituent groups, and the terms "heteroatom-containing hydrocarbyl" and "heterohydrocarbyl" refer to hydrocarbyl in which at least one carbon atom is replaced with a heteroatom.

The term "alkyl" is used herein to refer to a branched or unbranched, saturated or unsaturated acyclic hydrocarbon radical. Suitable alkyl radicals include, for example, methyl, ethyl, n-propyl, i-propyl, 2-propenyl (or allyl), vinyl, n-butyl, t-butyl, and i-butyl (or 2-methylpropyl). In particular embodiments, alkyls have between 1 and 200 carbon atoms, between 1 and 50 carbon atoms or between 1 and 20 carbon atoms.

"Substituted alkyl" refers to an alkyl as just described in which one or more hydrogen atom bound to any carbon of the alkyl is replaced by another group such as a halogen, aryl, substituted aryl, cycloalkyl, substituted cycloalkyl, heterocycloalkyl, substituted heterocycloalkyl, halogen, alkylhalos (e.g., $CF_3$), hydroxy, amino, phosphido, alkoxy, amino, thio, nitro, and combinations thereof. Suitable substituted alkyls include, for example, benzyl and trifluoromethyl.

The term "heteroalkyl" refers to an alkyl as described above in which one or more carbon atoms to any carbon of the alkyl is replaced by a heteroatom selected from the group consisting of N, O, P, B, S, Si, Sb, Al, Sn, As, Se and Ge. The bond between the carbon atom and the heteroatom may be saturated or unsaturated. Thus, an alkyl substituted with a heterocycloalkyl, substituted heterocycloalkyl, heteroaryl, substituted heteroaryl, alkoxy, aryloxy, boryl, phosphino, amino, silyl, thio, or seleno is within the scope of the term heteroalkyl. Suitable heteroalkyls include cyano, benzoyl, 2-pyridyl, and 2-furyl.

The term "cycloalkyl" is used herein to refer to a saturated or unsaturated cyclic non-aromatic hydrocarbon radical having a single ring or multiple condensed rings. Suitable cycloalkyl radicals include, for example, cyclopentyl, cyclohexyl, cyclooctenyl, and bicyclooctyl. In particular embodiments, cycloalkyls have between 3 and 200 carbon atoms, between 3 and 50 carbon atoms or between 3 and 20 carbon atoms.

"Substituted cycloalkyl" refers to cycloalkyl as just described including in which one or more hydrogen atom to any carbon of the cycloalkyl is replaced by another group such as a halogen, alkyl, substituted alkyl, aryl, substituted aryl, cycloalkyl, substituted cycloalkyl, heterocycloalkyl, substituted heterocycloalkyl, heteroaryl, substituted heteroaryl, alkoxy, aryloxy, boryl, phosphino, amino, silyl, thio, seleno and combinations thereof. Suitable substituted cycloalkyl radicals include, for example, 4-dimethylaminocyclohexyl, and 4,5-dibromocyclohept-4-enyl.

The term "heterocycloalkyl" is used herein to refer to a cycloalkyl radical as described, but in which one or more or all carbon atoms of the saturated or unsaturated cyclic radical are replaced by a heteroatom such as nitrogen, phosphorous, oxygen, sulfur, silicon, germanium, selenium, or boron. Suitable heterocycloalkyls include, for example, piperazinyl, morpholinyl, tetrahydropyranyl, tetrahydrofuranyl, piperidinyl, pyrrolidinyl, and oxazolinyl.

"Substituted-heterocycloalkyl" refers to heterocycloalkyl as just described including in which one or more hydrogen atom to any atom of the heterocycloalkyl is replaced by another group such as a halogen, alkyl, substituted alkyl, aryl, substituted aryl, heteroaryl, substituted heteroaryl, alkoxy, aryloxy, boryl, phosphino, amino, silyl, thio, seleno and combinations thereof. Suitable substituted heterocycloalkyl radicals include, for example, N-methylpiperazinyl, and 3-dimethylaminomorpholinyl.

The term "aryl" is used herein to refer to an aromatic substituent which may be a single aromatic ring or multiple aromatic rings which are fused together, linked covalently, or linked to a common group such as a methylene or ethylene moiety. The aromatic ring(s) may include phenyl, naphthyl, anthracenyl, and biphenyl. In particular embodiments, aryls have between 1 and 200 carbon atoms, between 1 and 50 carbon atoms or between 1 and 20 carbon atoms.

"Substituted aryl" refers to aryl as just described in which one or more hydrogen atom bound to any carbon is replaced by one or more hydrocarbyl groups such as alkyl, substituted alkyl, cycloalkyl, substituted cycloalkyl, heterocycloalkyl, substituted heterocycloalkyl, halogen, alkylhalos (e.g., $CF_3$), hydroxy, amino, phosphido, alkoxy, amino, thio, nitro, and both saturated and unsaturated cyclic hydrocarbons which are fused to the aromatic ring(s), linked covalently or linked to a common group such as a methylene or ethylene moiety. The common linking group may also be a carbonyl as in benzophenone or oxygen as in diphenylether or nitrogen in diphenylamine.

The term "heteroaryl" as used herein refers to aromatic or unsaturated rings in which one or more carbon atoms of the aromatic ring(s) are replaced by a heteroatom(s) such as nitrogen, oxygen, boron, selenium, phosphorus, silicon or sulfur. Heteroaryl refers to structures that may be a single aromatic ring, multiple aromatic ring(s), or one or more aromatic rings coupled to one or more non-aromatic ring(s). In structures having multiple rings, the rings can be fused together, linked covalently, or linked to a common group such as a methylene or ethylene moiety. The common linking group may also be a carbonyl as in phenyl pyridyl ketone. As used herein, rings such as thiophene, pyridine, isoxazole, pyrazole, pyrrole, and furan or benzo-fused analogues of these rings are defined by the term "heteroaryl."

"Substituted heteroaryl" refers to heteroaryl as just described including in which one or more hydrogen atoms bound to any atom of the heteroaryl moiety is replaced by another group such as a halogen, alkyl, substituted alkyl, aryl, substituted aryl, heteroaryl, substituted heteroaryl, alkoxy, aryloxy, boryl, phosphino, amino, silyl, thio, seleno and combinations thereof. Suitable substituted heteroaryl radicals include, for example, 4-N,N-dimethylaminopyridine.

The term "alkoxy" is used herein to refer to the $-OZ^1$ radical, where $Z^1$ is selected from the group consisting of alkyl, substituted alkyl, cycloalkyl, substituted cycloalkyl, heterocyloalkyl, substituted heterocycloalkyl, silyl groups and combinations thereof as described herein. Suitable alkoxy radicals include, for example, methoxy, ethoxy, benzyloxy, and t-butoxy. A related term is "aryloxy" where $Z^1$ is selected from the group consisting of aryl, substituted aryl, heteroaryl, substituted heteroaryl, and combinations thereof. Examples of suitable aryloxy radicals include phenoxy, substituted phenoxy, 2-pyridinoxy, and 8-quinalinoxy.

In certain embodiments of the inventive composition, each of $R_1$ and $R_2$ is selected from the group consisting of: $C_1$-$C_{20}$ alkyl; $C_1$-$C_{20}$ alkyl substituted by $C_1$-$C_{20}$ alkylamino, di($C_1$-$C_{20}$ alkyl)amino, $C_1$-$C_{20}$ alkyloxy or hydroxy; (poly($C_2$-$C_4$ alkoxy))-($C_2$-$C_4$ alkyl); $C_2$-$C_{20}$ alkenyl; $C_3$-$C_{12}$ cycloalkyl; $C_3$-$C_{12}$ cycloalkyl substituted by 1, 2 or 3 $C_1$-$C_{20}$ alkyl; cyclohexylmethyl; cyclohexylmethyl substituted by 1, 2 or 3 $C_1$-$C_{20}$ alkyl; $C_3$-$C_{20}$ cycloalkenyl; $C_3$-$C_{12}$ cycloalkenyl substituted by 1, 2 or 3 $C_1$-$C_{20}$ alkyl; phenyl; phenyl substituted by 1, 2 or 3 radicals selected from the group consisting of $C_1$-$C_{20}$ alkyl, $C_1$-$C_{20}$ alkyloxy, hydroxy, phenylamino, acylamino, phenylazo; phenyl substituted by halogens; $C_7$-$C_9$ phenylalkyl; $C_7$-$C_9$ phenylalkyl which is substituted on the phenyl by 1, 2 or 3 radicals selected from the group consisting of $C_1$-$C_{20}$ alkyl, $C_1$-$C_{20}$ alkoxy, and hydroxy; naphthyl; naphthyl substituted by $C_1$-$C_{20}$ alkyl; adamantyl; adamantyl substituted by $C_1$-$C_{20}$ alkyl; and a 5- or 6-membered heterocyclic group.

Whenever a $C_x$-$C_y$ carbon atom range is disclosed herein, all individual values and sub-ranges within the range of $C_x$ to $C_y$ is intended to be included herein and disclosed herein. For example, if the range is $C_1$-$C_{10}$, the range can be from a lower limit of $C_1$, $C_2$, $C_3$, $C_4$, $C_5$, $C_6$, $C_7$, $C_8$ or $C_9$ to an upper limit of $C_2$, $C_3$, $C_4$, $C_5$, $C_6$, $C_7$, $C_8$, $C_9$, or $C_{10}$. For example, the range includes $C_1$-$C_{10}$, or in the alternative, $C_2$-$C_8$, or in the alternative, $C_3$-$C_6$.

In certain embodiments of the invention, $R_1$ is selected from the group consisting of alkyls having from 6 to 12 carbon atoms, cycloalkyls having from 3 to 20 carbon atoms and aryls. All individual values and subranges from $C_6$ to $C_{12}$ alkyls are included herein and disclosed herein; for example, $R_1$ can be an alkyl having carbon atoms from a lower limit of 6, 7, 8, 9, 10, or 11 carbons to an upper limit of 7, 8, 9, 10, 11 or 12 carbons. For example, $R_1$ may be any alkyl in the range of from $C_6$ to $C_{12}$, or in the alternative, the $R_1$ may be any alkyl in the range of from $C_6$ to $C_{10}$. Likewise, all individual values and subranges from $C_3$ to $C_{20}$ cycloalkyls are included herein and disclosed herein; $R_1$ can be a cycloalkyl having carbon atoms from a lower limit of 3, 9, 12, 15, or 18 carbons to an upper limit of 4, 8, 10, 12, 14, 16, or 20 carbons. For example, $R_1$ may be any cycloalkyl in the range of from $C_6$ to $C_{12}$, or in the alternative, the $R_1$ may be any cyclalkyl in the range of from $C_6$ to $C_{10}$, or in the alternative, the $R_1$ may be any cyclalkyl in the range of from $C_3$ to $C_{20}$, or in the alternative, the $R_1$ may be any cyclalkyl in the range of from $C_{10}$ to $C_{18}$.

In certain embodiments of the invention, each $R_2$ is selected from the group consisting of alkyls having from 2 to 18 carbon atoms, cycloalkyls and aryls. All individual values and subranges from $C_2$ to $C_{18}$ alkyls are included herein and disclosed herein; for example, $R_2$ can be an alkyl having carbon atoms from a lower limit of 2, 4, 6, 8, 10, 12, 14, 16 or 17 carbons to an upper limit of 3, 5, 7, 9, 11, 13, 15, 17, or 18 carbons. For example, $R_2$ may be any alkyl in the range of from $C_2$ to $C_{18}$, or in the alternative, the $R_2$ may be any alkyl in the range of from $C_6$ to $C_{16}$.

In specific embodiments of the invention, $R_1$ is selected from the group consisting of hexyl, cyclohexyl and phenyl.

In some embodiments of the invention, each $R_2$ is selected from the group consisting of 1-dodecyl, 2-ethylhexyl, cyclohexyl, 4-methylphenyl, sec-butyl, and tert-butyl.

Each of $R_1$, $R_2^a$ and $R_2^b$ are independently selected, meaning that each of $R_1$, $R_2^a$ and $R_2^b$ are independently selected from all potential hydrocarbyl groups irrespective of the hydrocarbyl group of the other R groups.

In some embodiments of the invention, the one or more bis-oxalamide compounds are present in a total amount from 0.001 to 5 percent by weight. All individual values and sub-ranges from 0.001 to 5 percent by weight are included herein and disclosed herein; for example, the total amount of bis-oxalamide in the composition can be from a lower limit of 0.001, 0.002, 0.005, 0.01, 0.05, 0.1, 0.5, 1, 1.5, 2, 2.5, 3, 3.5, 4 or 4.5 weight percent to an upper limit of 0.0025, 0.006, 0.015, 0.07, 0.15, 0.5, 1, 1.5, 2, 2.5, 3, 3.5, 4, or 5 weight percent. For example, the total amount of bis-oxalamide in the composition may be in the range of from 0.001 to 5 weight percent, or in the alternative, the total amount of bis-oxalamide in the composition may be in the range of from 0.025 to 0.2 weight percent, or in the alternative, the total amount of bis-oxalamide in the composition may be in the range of from 0.025 to 0.5 weight percent, or in the alternative, the total amount of bis-oxalamide in the composition may be in the range of from 0.02 to 0.1 weight percent.

In some embodiments, the semi-crystalline polyolefin composition exhibits a reduction in haze of at least 15% in comparison to the haze of the semi-crystalline polyolefin in the absence of a clarifier. All individual values and sub-ranges from at least 15% are included herein and disclosed herein; for example, the comparative decrease in haze can be from a lower limit of at least 15, 16, 17 or 18%.

In certain embodiments, the semi-crystalline polyolefin composition exhibits an increase of the crystallization temperature of at least 4° C. in comparison to the crystallization temperature of the semi-crystalline polyolefin. All individual values and sub-ranges from at least 4° C. are included herein and disclosed herein; for example, the comparative increase in crystallization temperature can be from a lower limit of at least 4, 4.5, 5, 5.5, 6, 6.5, or 7° C.

In one specific embodiment, the thermoplastic crystallizable polyolefin is a crystallizable polypropylene.

In particular embodiments of the invention, the thermoplastic polyolefin is selected from the group consisting of propylene/α-olefin random copolymer, propylene/α-olefin segmented copolymer, propylene/ethylene segmented copolymer and propylene/α-olefin block copolymer. As used in this context, the term "α-olefin" includes ethylene.

In some embodiments of the invention, the α-olefin in the thermoplastic crystallizable polyolefin is 1-butene.

In yet other embodiments, the thermoplastic crystallizable polyolefin is a propylene/ethylene/olefin terpolymer. In one particular embodiment, the thermoplastic crystallizable polyolefin is a propylene/ethylene/butene terpolymer.

One or more nucleating agents, other than the bis-oxalamide clarifier, may also be added to some embodiments of the inventive composition. Such nucleating agents may be selected from the group consisting of: (1) aromatic sorbitol acetals; (2) nucleating agents based upon salts of phosphoric acid; (3) nucleating agents based upon salts of carboxylic acids; (4) nucleating agents based upon carboxy aluminum-hydroxide; (5) nucleating agents based upon salts of rosin/adiabatic acid; (6) Zinc (II) monoglycerolate; (7) nucleating agents based upon diamide compounds; and (8) nucleating agents based upon trimesic acid derivatives. Combinations of such nucleating agents may also be added, in some embodiments, to the inventive composition.

Shaped articles comprising one or more embodiments of the inventive semi-crystalline polyolefin composition are also provided by the invention. Exemplary shaped articles include food packaging, beverage packaging, non-food and non-beverage packaging such as CD cases, films, fibers, profiles, pipes, bottles, tanks and containers.

In some embodiments, the shaped article is molded. In specific embodiments, the molded article is prepared by one or more processes selected from the group consisting of injection molding, blow molding, compression molding, roto-molding, slush-molding and extrusion.

The invention further provides monoaxially-oriented films and biaxially-oriented films which are formed by stretching a film which comprises one or more of the inventive semi crystalline polyolefin composition.

The invention further provides a multilayer system in which one or more layers comprise one or more of the inventive semi-crystalline polyolefin composition.

EXAMPLES

The following examples illustrate the present invention but are not intended to limit the scope of the invention.

All materials tested as clarifier were dried before use and compounded with a polypropylene random copolymer. All examples were compounded using an APV Baker MP19TC extruder obtained from Baker Perkins Group, Ltd. (Peterborough, UK). For all examples, a $N_2$ flow was passed into the hopper and the $O_2$ concentration was adjusted at a standard value of ±4% $O_2$. The Barrel Temperatures of the extruder zones were the same for all examples, as follows: Zone 1 at 170° C.; Zone 2 at 190° C.; Zone 3 at 210° C.; Zone 4 at 225° C.; Zone 5 at 240° C.; Zone 6 at 250° C.; Zone 7 at 250° C.; and Die temperature at 250° C. These settings resulted in a melt temperature of the polymer of approximately 256° C. The extruder was set at 400 RPM for all examples. The melt temperature, oxygen #(% of measured oxygen remaining) and output (approximately 3 kg/hr) were similar for Comparative Examples 1-4 and Inventive Examples 1-6 and 10.

The compositions of the Inventive and Comparative Examples were each stabilized with 500 ppm IRGANOX 1010 (commercially available from BASF), 1000 ppm IRGAFOS 168 (commercially available from BASF), and 500 ppm calcium stearate and 150 ppm DHT-4A.

Table 1 provides the structure of the clarifiers used in the Inventive Examples.

TABLE 1

| Clarifier Designation | Clarifier |
|---|---|
| A | 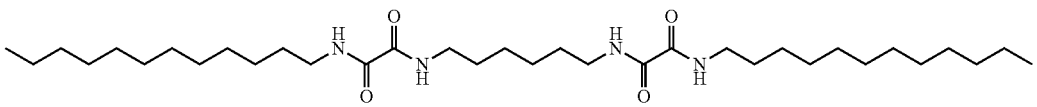 [SMILES: CCCCCCCCCCCCNC(=O)C(=O)NCCCCCCNC(=O)C(=O)NCCCCCCCCCCCC] |

TABLE 1-continued

| Clarifier Designation | Clarifier |
|---|---|
| B | Cyclohexyl-NH-C(O)-C(O)-NH-(CH2)6-NH-C(O)-C(O)-NH-cyclohexyl |
| C | (2-ethylhexyl)-NH-C(O)-C(O)-NH-(CH2)6-NH-C(O)-C(O)-NH-(2-ethylhexyl) |
| D | (4-methylbenzyl)-NH-C(O)-C(O)-NH-(CH2)6-NH-C(O)-C(O)-NH-(4-methylbenzyl) |
| E | 1,3-bis[(2-ethylhexyl)aminooxalylamino]cyclohexane derivative |
| F | sec-butyl-NH-C(O)-C(O)-NH-(1,4-phenylene)-NH-C(O)-C(O)-NH-sec-butyl |

Table 2 provides the crystallizable polyolefins and clarifiers and clarifier weight percentage used in the compositions of Inventive Examples 1-13.

The crystallizable polyolefins used in the Inventive Examples were: (1) a random propylene/ethylene copolymer, having a melt flow index of 42 g/10 min., 4.2 wt % of units derived from ethylene and a xylene soluble fraction of 7.5 wt % (available as DR7032 from THE DOW CHEMICAL COMPANY); or (2) a random propylene/ethylene copolymer, having 3.9 wt % units derived from ethylene, a melt flow index of 9.75 g/10 min, and a xylene soluble fraction of 6.75 wt % (available as R7051-10RN from THE DOW CHEMICAL COMPANY), as indicated in Table 2.

TABLE 2

| Inventive Example No. | Polyolefin | Clarifier/wt % |
|---|---|---|
| 1 | DR7032 | A/0.1 |
| 2 | DR7032 | A/0.2 |
| 3 | DR7032 | B/0.2 |
| 4 | DR7032 | C/0.1 |
| 5 | DR7032 | C/0.2 |
| 6 | DR7032 | D/0.2 |
| 7 | DR7032 | E/0.025 |
| 8 | DR7032 | E/0.05 |
| 9 | DR7032 | E/0.1 |

TABLE 2-continued

| Inventive Example No. | Polyolefin | Clarifier/wt % |
|---|---|---|
| 10 | DR7032 | E/0.2 |
| 11 | R7051 | F/0.025 |
| 12 | R7051 | F/0.05 |
| 13 | R7051 | F/0.1 |

Comparative Example 1 contained a random propylene/ethylene copolymer, having a melt flow index of 42 g/10 min., 4.2 wt % of units derived from ethylene and a xylene soluble fraction of 7.5 wt % (available as DR7032 from THE DOW CHEMICAL COMPANY), and stabilizers as indicated above with no clarifier.

Comparative Example 2 contained DR7032 random propylene/ethylene copolymer and stabilizers as indicated above plus 0.2 weight percent MILLAD 3988 (which is a dimethylbenzylidene-sorbitol) (available from MILLIKEN & COMPANY).

Comparative Example 3 contained DR7032 random propylene/ethylene copolymer and stabilizers as indicated above plus 0.2 weight percent MILLAD 3988 and 0.1 weight percent glycerolmonostearate (GMS) which is used as a release agent and which is available from ADEKA PALMAROLE SAS (Saint-Louis, Alsace, France).

Comparative Example 4 contained DR7032 random propylene/ethylene copolymer and stabilizers as indicated above plus 0.2 weight percent MILLAD NX-8000 (which is a Bis (4-propylbenzylidene)propyl sorbitol, available from MILLIKEN & COMPANY).

Comparative Example 5 contained a random propylene/ethylene copolymer, having 3.9 wt % units derived from ethylene, a melt flow index of 9.75 g/10 min, and a xylene soluble fraction of 6.75 wt % (available as R7051-10RN from The Dow Chemical Company), and stabilizers as indicated above with no clarifier.

Table 3 provides the crystallization temperatures of Comparative Example 1, Inventive Examples 2, 5, 6, 12 and 13.

TABLE 3

| Example | Tc (° C.) |
|---|---|
| Comp. Ex. 1 | 103 |
| Inv. Ex. 2 | 107 |
| Inv. Ex. 5 | 110 |
| Inv. Ex. 6 | 107 |
| Inv. Ex. 12 | 113 |
| Inv. Ex. 13 | 114 |

Each of the clarifiers used in the Inventive Examples were synthesized. The method of synthesizing these clarifiers can be described by reference to the method used to produce the clarifier used in Inventive Example 1:

Synthesis of N1,N1'-(hexane-1,6-diyl)bis(N2-dodecyloxalamide)

Step 1:

A solution of 1,6 diaminohexane (50.0 g, 0.43 mol) in 200 ml of tetrahydrofuran was slowly added to diethyloxalate (629.4 g, 4.31 mol) and the mixture was stirred at room temperature. After 16 hours, the solvent and excess of diethyloxalate was removed by filtering the product. Subsequently, the filtrate was dissolved in chloroform and filtered (P5) and the chloroform in the filtrate was removed under reduced pressure. The product was washed two times with diethyl ether and dried in vacuum. The product was obtained as a white powder (having a melting point of 90° C.).

Step 2:

Diethyl 2,2'-(hexane-1,6-diylbis(azanediyl))bis(2-oxoacetate) (5.00 g, 15.8 mmol) and dodecyl amine (5.85 g, 31.64 mmol) were dissolved in 100 ml of $CHCl_3$. Subsequently the mixture was heated at reflux temperature for 24 hours. The solvent was removed by filtering the product. The remaining solid was washed two times with $CHCl_3$ and two times with diethyl ether and dried in vacuum. The product was obtained as a white powder.

Each of Inventive Examples 1-7 and 11-13 and Comparative Examples 1-5 were injection molded using a DEMAG 3 (SUMITOMO (SHI) DEMAG, Schwaig, Germany) operated at standard (200° C.) and/or high (230° C.) temperatures, under the conditions shown in Table 4 below.

TABLE 4

| Date | Value | Units |
|---|---|---|
| Injection pressure | 2400 | Bar |
| Injection speed | 24 | mm/s |
| Holding time | 4 | Sec |
| Holding pressure | 500 | Bar |
| Cooling time | 35 | Sec |
| Screw speed | 100 | U/min* |
| Back pressure | 100 | Bar |
| Screw stop | 32.0 | mm |
| Dosage stop | 30.0 | Mm |
| Pn SC-weg** | 10.0 | Mm |
| Injection profile | No | |
| Holding profile | Yes | |
| Dosage profile | No | |
| Injection molding mach | DEMAG 3 | |

*U/min has the same meaning as RPM (or revolutions per minute); and
**Pn SC-weg indicates the switch-over position from injection pressure to holding pressure.

The injected molded samples were examined for transmittance, haze and clarity. The results of this testing is shown in Table 5. Table 5 provides the mean calculated for four measurements of each property for each example listed.

TABLE 5

| Example | Injection Molding Temperature | Transmittance (%) | Haze (%) | Clarity (%) |
|---|---|---|---|---|
| Comp. Ex. 1 | Standard Temperature | 89.9 | 58.7 | 75.5 |
| | High Temperature | 90.1 | 65.3 | 66 |
| Comp. Ex. 2 | Standard Temperature | 89.4 | 39.2 | 97.6 |
| | High Temperature | 88.6 | 9.8 | 99.6 |
| Comp. Ex. 3 | Standard Temperature | 90.2 | 38.6 | 97.7 |
| Comp. Ex. 4 | Standard Temperature | 88.8 | 14.9 | 99.6 |
| | High Temperature | 88.6 | 14.7 | 99.6 |
| Comp. Ex. 5 | High Temperature | 89.9 | 41.2 | 84.5 |
| Inv. Ex. 1 | Standard Temperature | 89.3 | 38.1 | 99.4 |
| | High Temperature | 89.4 | 39.6 | 99.5 |
| Inv. Ex. 2 | Standard Temperature | 89.9 | 41.1 | 97.4 |
| | High Temperature | 89.8 | 40.8 | 97.2 |
| Inv. Ex. 3 | High Temperature | 86 | 84.6 | 95.8 |
| Inv. Ex. 4 | High Temperature | 90 | 40.7 | 96.4 |
| Inv. Ex. 5 | Standard Temperature | 90 | 37.3 | 97.5 |
| | High Temperature | 89.7 | 36 | 97.9 |
| Inv. Ex. 6 | Standard Temperature | 89.9 | 47.5 | 92.9 |
| Inv. Ex. 7 | High Temperature | 90.7 | 34.2 | 99.1 |
| Inv. Ex. 11 | High Temperature | 89.9 | 23.4 | 99.5 |
| Inv. Ex. 12 | High Temperature | 90.2 | 30.9 | 98.8 |
| Inv. Ex. 13 | High Temperature | 89.4 | 32.2 | 98.3 |

As can be seen in Table 5, Inventive Examples display transmittance and clarity comparable to those obtained with current commercial clarifiers, e.g., Comparative Examples 2-4 under standard injection molding conditions. In contrast, with MILLAD 3988, higher molding temperatures are necessary to dissolve that clarifier in the polyolefin.

As can be seen in Table 5, the clarifiers used in the Inventive Example 7 and 11 may be used at levels of only 0.025 wt % and still exhibit the improvements in optical properties observed with higher levels. Such clarifier concentration is a factor of 10 less than that required when using the current commercial products, MILLAD 3988 and MILLAD NX-8000.

Inventive Examples 11-13 may be used to examine the effect of the level of clarifier on transmittance, haze and clarity. As can be seen in Table 5, levels as low as 0.025 wt % provided as good or better transmittance, haze and clarity as clarifier levels of 0.05 and 0.1 wt %.

Inventive Examples 7-9 were examined for transmittance, haze and clarity two hours following injection molding and two days following injection molding. Inventive Example 10 was examined 2 days after injection molding. Such testing was also conducted on Comparative Example 1 (with no clarifier). The results of this testing is shown in Table 6.

TABLE 6

| Example/Elapsed Time | Transmittance (%) | Haze (%) | Clarity (%) |
|---|---|---|---|
| Comp. Ex. 1/2 hours | 88.5 | 50.2 | 87.3 |
| Comp. Ex. 1/2 days | 89.5 | 50.2 | 87.5 |
| Inv. Ex. 7/2 hours | 90.2 | 38 | 99.3 |
| Inv. Ex. 7/2 days | 90.1 | 39.8 | 99.3 |
| Inv. Ex. 8/2 hours | 90.2 | 33.5 | 99.4 |
| Inv. Ex. 8/2 days | 90 | 35.1 | 99.4 |
| Inv. Ex. 9/2 hours | 90.4 | 29.7 | 99.5 |
| Inv. Ex. 9/2 days | 90.3 | 31.3 | 99.5 |
| Inv. Ex. 10/2 days | 90.7 | 34.2 | 99.1 |

Inventive Examples 7-9 were made by down blending from Inventive Example 10, indicating that the clarifiers used in these examples may be used in a recycled system.

Mechanical properties, specifically flexural modulus, flexural stress, elongation (ε) at break, and Charpy Impact were also examined for each of Comparative Examples 1-4 and Inventive Examples 2-4 and 6-7. Table 7 summarizes the results of such testing.

TABLE 7

| Example | Flex Mod (N/mm²) | Flex Stress (N/mm²) | ε at Break (%) | Charpy Impact (KJ/m²) |
|---|---|---|---|---|
| Comp. Ex. 1 | 816 | 26 | 9.3 | 5.3 |
| Comp. Ex. 2 | 1062 | 31 | 8.9 | 7.9 |
| Comp. Ex. 3 | 1062 | 31 | 8.8 | 8.3 |
| Comp. Ex. 4 | 1009 | 29 | 9 | 8.1 |
| Inv. Ex. 2 | 977 | 29 | 8.7 | 7.1 |
| Inv. Ex. 3 | 1048 | 33 | 8.8 | 4.1 |
| Inv. Ex. 4 | 970 | 29 | 8.7 | 7.6 |
| Inv. Ex. 6 | 959 | 29 | 8.8 | 8.7 |
| Inv. Ex. 7 | 1087 | 32 | 8.3 | 7.6 |

As can be seen in Table 7, the Inventive Examples exhibit an improvement in mechanical properties over Comparative Example 1 and comparable to improvements seen in Comparative Examples 2-4.

TEST METHODS

Test methods include the following:

Flexural Modulus was measured in accordance with ISO-178; Elongation at break and Flexural stress were measured in accordance with ISO-527/1A (i.e., using a Zwick Z010, measured after 48 hours at 23° C. and 50% humidity following injection molding).

Charpy Impact was measured in accordance with ISO-179/1eA, using a Zwick Z5102, 80*10*4 mm bar Type A notch (r=0.25 mm) 1J hammer.

Haze, Transmittance, and Clarity were measured in accordance with ASTM D1003, using a Hazeguard, with 1 mm injection molded plaque with a polished mold.

Differential scanning calorimetry: samples were analyzed by heating with 10° C./min from room temperature to 250° C. and left to equilibrate isothermally for 3 minutes. Temperature was then ramped from 250° C. to −30° C. at 10° C./min. After reaching −30° C., that temperature was maintained for 3 minutes followed by heating at 10° C./min to 250° C. Both cooling and second heating curves were used to estimate peak maximum crystallization temperature and melting temperature, together with the heat of fusion.

The present invention may be embodied in other forms without departing from the spirit and the essential attributes thereof, and, accordingly, reference should be made to the appended claims, rather than to the foregoing specification, as indicating the scope of the invention.

We claim:

1. A semi-crystalline polyolefin composition comprising:
   a thermoplastic crystallizable polyolefin; and
   one or more di-alkyl bis-oxalamide compounds having the formula:

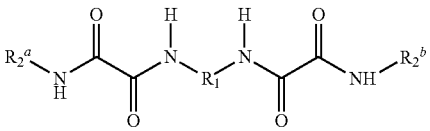

wherein $R_1$ is a spacer group and each $R_2$ is a peripheral group; wherein each of $R_1$ and $R_2^a$ and $R_2^b$ is an independently selected hydrocarbyl group devoid of aryl and substituted aryl; and wherein each of $R_1$ and $R_2$ is selected from the group consisting of:
   $C_1$-$C_{20}$ alkyl;
   $C_1$-$C_{20}$ alkyl substituted by $C_1$-$C_{20}$ alkylamino, di($C_1$-$C_{20}$ alkyl)amino, $C_1$-$C_{20}$ alkyloxy or hydroxy;
   (poly($C_2$-$C_4$ alkoxy))-($C_2$-$C_4$ alkyl); $C_2$-$C_{20}$ alkenyl; $C_3$-$C_{12}$ cycloalkyl; $C_3$-$C_{12}$ cycloalkyl substituted by 1, 2 or 3 $C_1$-$C_{20}$ alkyl; cyclohexylmethyl;
   cyclohexylmethyl substituted by 1, 2 or 3 $C_1$-$C_{20}$ alkyl;
   $C_3$-$C_{20}$ cycloalkenyl; $C_3$-$C_{12}$ cycloalkenyl substituted by 1, 2 or 3 $C_1$-$C_{20}$ alkyl;
   adamantyl;
   adamantyl substituted by $C_1$-$C_{20}$ alkyl; and
   5- or 6-membered heterocyclic groups.

2. The semi-crystalline polyolefin composition according to claim 1, wherein the one or more bis-oxalamide compounds are present in a total amount from 0.001 to 5 percent by weight based on a total weight of the polyolefin composition.

3. The semi-crystalline polyolefin composition according to claim 1, wherein the semi-crystalline polyolefin composition exhibits a reduction in haze of at least 15% in comparison to the haze of the thermoplastic semi-crystalline polyolefin in the absence of the one or more bis-oxalamide compounds.

4. The semi-crystalline polyolefin composition according to claim 1, wherein the semi-crystalline polyolefin composition exhibits an increase of the crystallization temperature of at least 4° C. in comparison to the crystallization temperature of the thermoplastic crystallizable polyolefin in the absence of the one or more bis-oxalamide compounds.

5. The semi-crystalline polyolefin composition according to claim 1, wherein the thermoplastic crystallizable polyolefin is selected from the group consisting of propylene/α-olefin random copolymer, propylene/α-olefin segmented copolymer, and propylene/α-olefin block copolymer.

6. The semi-crystalline polyolefin composition according to claim 1, wherein the semi-crystalline polyolefin composition further comprises one or more β-nucleating agents selected from the group consisting of: (1) aromatic sorbitol acetals; (2) nucleating agents based upon salts of phosphoric acid; (3) nucleating agents based upon salts of carboxylic acids; (4) nucleating agents based upon carboxy aluminum-hydroxide; (5) nucleating agents based upon salts of rosin/adiabatic acid; (6) Zinc (II) monoglycerolate; (7) nucleating agents based upon diamide compounds; and (8) nucleating agents based upon trimesic acid derivatives.

7. A method of making a semi-crystalline polyolefin composition comprising:
providing a crystallizable polyolefin;
adding to the polyolefin one or more di-alkyl bis-oxalamide compounds having the formula:

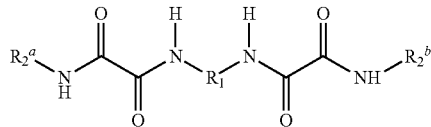

wherein $R_1$ is a spacer group and each $R_2$ is a peripheral group and wherein each of $R_1$ and $R_2{}^a$ and $R_2{}^b$ is an independently selected hydrocarbyl group devoid of aryl and substituted aryl and wherein each of $R_1$ and $R_2$ is selected from the group consisting of:

$C_1$-$C_{20}$ alkyl;
$C_1$-$C_{20}$ alkyl substituted by $C_1$-$C_{20}$ alkylamino, di($C_1$-$C_{20}$ alkyl)amino, $C_1$-$C_{20}$ alkyloxy or hydroxy;
(poly($C_2$-$C_4$ alkoxy))—($C_2$-$C_4$ alkyl); $C_2$-$C_{20}$ alkenyl;
$C_3$-$C_{12}$ cycloalkyl; $C_3$-$C_{12}$ cycloalkyl substituted by 1, 2 or 3 $C_1$-$C_{20}$ alkyl; cyclohexylmethyl;
cyclohexylmethyl substituted by 1, 2 or 3 $C_1$-$C_{20}$ alkyl;
$C_3$-$C_{20}$ cycloalkenyl; $C_3$-$C_{12}$ cycloalkenyl substituted by 1, 2 or 3 $C_1$-$C_{20}$ alkyl;
adamantyl;
adamantyl substituted by $C_1$-$C_{20}$ alkyl; and
compounding the polyolefin with the one or more di-alkyl bis-oxalamide compounds using one or more processes selected from the group consisting of injection molding, blow molding, compression molding, roto-molding, slush molding and extrusion.

8. The method according to claim 7, wherein the one or more bis-oxalamide compounds are added in a total amount from 0.001 to 5 percent by weight based on a total weight of the polyolefin composition.

9. The method according to claim 7, wherein each $R_2$ is selected from the group consisting of 1-dodecyl, 2-ethylhexyl, cyclohexyl, sec-butyl, and tert-butyl.

10. The method according to claim 7, wherein the semi-crystalline polyolefin composition exhibits an increase of the crystallization temperature of at least 5° C. in comparison to the crystallization temperature of the polyolefin in the absence of the one or more bis-oxalamide compounds.

* * * * *